UNITED STATES PATENT OFFICE.

HUGO GELDERMANN, OF BERLIN, GERMANY, ASSIGNOR TO ACTIEN GESELLSCHAFT FÜR ANILIN FABRIKATION, OF SAME PLACE.

BLACK DISAZO DYE.

SPECIFICATION forming part of Letters Patent No. 676,494, dated June 18, 1901.

Application filed March 26, 1901. Serial No. 52,897. (No specimens.)

*To all whom it may concern:*

Be it known that I, HUGO GELDERMANN, of Berlin, in the Kingdom of Prussia, German Empire, have invented new and useful Improvements in Black Disazo Dyes; and I do hereby declare that the following is a full, clear, and exact description thereof, which will enable others skilled in the art to which it appertains to make and use the same.

My invention relates to the production of a new disazo dye directly dyeing cotton which contains as end component $beta_1$-amido-$alpha_4$-naphthol-$beta_3$-sulfonic acid, as middle component $alpha_1$-naphthylamin-$beta_3$-sulfonic acid, (Cleve's acid,) and as first component the alkyl ether of para-diamido-para-cresol, represented by the formula:

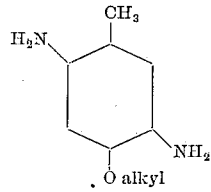

The following example shows how the production of my new dyestuff may be best carried out, the parts being by weight: 18.2 parts of the methyl ether of nitroamido-para-cresol ($CH_3:NH_2:NO_2:OCH_3=1:3:6:4$) are dissolved in water and thirty parts of concentrated hydrochloric acid, and the solution obtained is diazotized with seven parts of sodium nitrite at low temperature. The diazo solution is allowed to run into a refrigerated aqueous solution of twenty-four parts of $alpha_1$-naphthylamin-$beta_3$-sulfonic acid and eighteen parts of sodium carbonate while stirring well. The amidoazo compound thus formed separates after the addition of forty-eight parts of concentrated hydrochloric acid. The mass is then refrigerated by the addition of crushed ice and diazotized once more by means of 7.7 parts of sodium nitrite. The diazo-azo compound thus produced separates as a blackish-brown precipitate. It is stirred into a solution prepared by dissolving in water twenty-seven parts of $beta_1$-amido-$alpha_4$-naphthol-$beta_3$-sulfonic acid and 27.5 parts of sodium carbonate, and stirring is continued for about twelve hours until the formation of the dyestuff is completed. Finally, in order to convert the nitro group into an amido group sodium sulfid is added to the mass, and the mixture is stirred at moderate temperature until the reduction is completed. The new disazo dyestuff is then salted out, filtered, pressed, and dried. It forms a dark powder of a weak metallic luster. It is hardly soluble in alcohol and easily soluble in water to a dull brown-violet solution. The coloration of the aqueous solution remains unchanged by the addition of sodium carbonate or of a small quantity of caustic-soda lye. By an excess of caustic-soda lye the dye is precipitated in the form of blackish-violet flakes. It is likewise precipitated by mineral acids or acetic acid in the form of red-violet flakes.

The dye dissolves in concentrated sulfuric acid to a dull dark-blue solution, which on dilution with ice-water becomes red, the dye being separated.

The new disazo dye produces on unmordanted cotton from a bath containing soap or common salt bluish-black shades, which by a subsequent diazotation on the fiber and development with metatoluylenediamin are converted into a fine black of remarkable fastness.

In the preceding example for the $alpha_1$-naphthylamin-$beta_3$-sulfonic acid may be substituted the $alpha_1$-naphthylamin-$beta_4$-sulfonic acid or a mixture of both these acids without essentially changing the result.

Having thus described my invention and in what manner the same is to be carried out, what I claim is—

The new disazo dye containing as first component the 6.3-diamido-para-cresol-methyl ether represented by the formula:

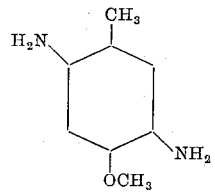

as middle component $alpha_1$-naphthylamin-$beta_3$-sulfonic acid and as end component $beta_1$-amido-$alpha_4$-naphthol-$beta_3$-sulfonic acid; said dye being in the dry state a dark powder of a weak metallic luster, hardly soluble in alcohol, easily soluble in water to a dull brown-violet solution; this aqueous solution remaining unchanged by the addition of sodium carbonate or a small quantity of caustic-soda lye; the dye being precipitated from its aqueous solution by an excess of caustic-soda lye in the form of blackish-violet flakes, or by the addition of mineral acids or acetic acid in the form of red-violet flakes; the dye being soluble in concentrated sulfuric acid to a dull blue solution, which on dilution with ice-water gets red and separates the dyestuff; the dye producing on unmordanted cotton from a bath containing soap or common salt bluish-black tints, which by a subsequent diazotation on the fiber and development with metatoluylenediamin are converted into a fine black of remarkable fastness.

In witness whereof I have hereunto signed my name, this 9th day of March, 1901, in the presence of two subscribing witnesses.

HUGO GELDERMANN.

Witnesses:
WOLDEMAR HAUPT,
HENRY HASPER.